United States Patent [19]
Drown et al.

[11] Patent Number: 5,487,907
[45] Date of Patent: Jan. 30, 1996

[54] PROCESS TO RECOVER OIL FROM CRUMBS, FOOD PARTICLES AND CARBOHYDRATE MATRICES

[76] Inventors: David C. Drown, 818 Vista St., Moscow, Id. 83843-9629; Karen Montez, 1010 Deakin #6, Moscow, Id. 83843

[21] Appl. No.: 324,170

[22] Filed: Oct. 14, 1994

[51] Int. Cl.$^6$ .................................................. C11B 13/00
[52] U.S. Cl. ............................. 426/417; 426/478; 99/495; 134/25.3; 134/40; 210/803; 210/805; 210/774; 210/DIG. 8
[58] Field of Search ...................... 134/25.3, 40; 99/495; 426/417, 478; 210/800, 802, 803, 804, 805, 513, 523, DIG. 8, 633, 708, 737, 738, 774

[56] References Cited

U.S. PATENT DOCUMENTS

| | | | |
|---|---|---|---|
| 3,346,391 | 10/1967 | Miller et al. | 426/417 |
| 3,968,741 | 7/1976 | Hunt | 210/DIG. 8 |
| 4,968,518 | 11/1990 | Lopez | 210/DIG. 8 |
| 5,252,138 | 10/1993 | Guymon | 134/40 |

Primary Examiner—Robert A. Dawson
Assistant Examiner—Robert James Popovics
Attorney, Agent, or Firm—Wells, St. John, Roberts, Gregory & Matkin

[57] ABSTRACT

This invention generally provides a process and apparatus for the separation of oil or fat from food particles, carbohydrate matrices and crumbs in a continuous process, and for the reuse and/or recycling of the separated oil or fat. This invention more particularly provides an apparatus and a process in which the crumbs are mixed with hot water and agitated for a predetermined time, after which the agitated mixture is introduced into a non-turbulent container where the oil/fat, the water and the crumbs are allowed to stratify. Upon stratification, a high quality oil/fat separates and rises based on its relative buoyancy and can then be removed and reused. The water and the crumbs also separate by stratification and can also be similarly removed.

15 Claims, 2 Drawing Sheets

PROCESS TO RECOVER OIL FROM CRUMBS, FOOD PARTICLES AND CARBOHYDRATE MATRICES

FIELD OF THE INVENTION

This invention generally pertains to a process and apparatus for the separation and recovery of oils and animal fats from crumbs, food particles and carbohydrate matrices.

BACKGROUND OF THE INVENTION

The manufacture and frying of battered and other food products, can result in the creation of significant quantities of oil-laden and fat-laden crumbs, food particles and/or carbohydrate matrices. Although this invention applies to the separation and removal of oils and animal fats, for ease of reference, the terms oils or oil will be used herein and should be considered to refer to both oils and fats. Also, this invention applies to use for crumbs, carbohydrate matrices and food particles of all kinds, however, for ease of reference, the terms crumb or crumbs will be used generically to refer to all applications. Still further, while the solvent used to separate the oil from the crumb can be water or a solution of water and other compounds, an aqueous solution, the term water will be used generically to refer to water or an aqueous solution.

These crumbs can contain up to 75% oil by weight. The disposal of these crumbs, often as waste or low value by-product, results in a significant oil loss from the trying process. Experiments have shown that more than 95% of this oil can be recovered with little change in oil quality. It is this recovery that this invention is directed to.

Table 1 presents the results of an analysis of recovered oil samples. It shows an average increase in Percent Free Fatty Acid (%FFA) of 0.05% and an increase in Percent Moisture Content (%) of 0.65% when compared to oil samples taken from the fryer.

TABLE 1

Oil Analysis Results

| Test | Average Change |
| --- | --- |
| Percent Free Fatty Acid (% FFA) | 0.05% |
| Percent Moisture Content (%) | 0.65% |

In addition to the benefit of recovery of valuable cooking oil, there are other costs and problems associated with disposal of oil-laden crumbs which this invention can reduce or eliminate. If the crumbs are currently treated in a waste water treatment facility, clarifier loading can be reduced by eliminating part or all of this source of waste.

Landfilling crumbs, while an easy solution, adds disposal costs to the cost of replacing cooking oil which is discarded with the crumbs. Environmental concerns and increasingly restrictive regulations seem to indicate that landfilling crumbs may not be a long term viable option, or it may make the process economically unfeasible.

Merely disposing of the oil-laden crumbs is losing something of potential value. Table 2 shows the estimated value of the lost cooking oil based on hourly crumb production. The values are calculated based on a $2.00/gallon cooking oil replacement cost, and a conservative assumption that the crumbs contain 50% oil by weight. Analysis of crumbs produced by one commercial facility making battered french fries indicates that the actual oil content may average approximately 70%. The cost of recovering oil from crumbs will vary from one site to another but is estimated to be less than one cent per pound of recovered oil.

TABLE 2

Estimated Daily Oil Loss

| Crumb production [lb/hr] | Oil lost daily [gal/day] | Dollar value of oil [$/day] |
| --- | --- | --- |
| 800 | 1,300 | 2,600 |
| 1,000 | 1,650 | 3,300 |
| 1,200 | 2,000 | 4,000 |

Prior attempts at the recovery of oil have generally resulted in an unacceptable recovery rate, for one or more of a number of different problems, namely: they result in the formation of an emulsion instead of separation of the oil or fat from the crumb or food particle material; they do not recover a high percentage of the oil contained in the crumb; they discharge too much waste; they have been unable to provide such a process or device which is relatively inexpensive to construct and operate; and they have been unable to provide a system that operates effectively when wide variations in the composition of the feedstock occur.

The normal waste from these manufacturing processes is waste grade oil or grease and normally has a value, if any, of only two or three cents per pound, whereas food grade oil has an approximate value range of thirty to forty cents per pound. This invention provides a means to recover the same quality of oil that exists in the original matrix prior to treatment, thereby having substantially more value to the manufacturer.

This invention solves the forenamed problems to a degree not heretofore achieved on any scale, let alone for a commercial production unit capable of continuous production.

SUMMARY OF THE INVENTION

This invention generally provides a process and apparatus for the separation of oil or fat from crumbs in a commercial process, and for the reuse and/or recycling of the separated oil or fat. This invention more particularly provides an apparatus and a process in which the oil-laden crumbs are mixed with hot water and agitated for a pre-determined time, after which the agitated mixture is introduced into a non-turbulent container where the oil/fat, the water and the carbohydrate sludge is allowed to stratify. Upon stratification, an oil/fat separates and rises based on its relative buoyancy and can then be removed and reused. The water and the crumbs also separate by stratification and can also be similarly removed.

It is an object of this invention to provide a system that can recover high percentages of oils and animal fats from crumbs or spent carbohydrate matrices from the battering and frying process and to do so in such a way that it can be adapted for use on a large volume, continuous or batch operation and commercial basis.

It is a further object of this invention to provide such a system where water or an aqueous solution is used as the solvent to separate the oil from the crumbs, which this invention does accomplish.

It is a further object of this invention to provide such a system which minimizes the amount of material discharged, including the working fluid (preferably water), the oil and the volume of the crumbs.

It is an object of this invention to provide such an oil recovery system that accomplishes the entire separation process with a separation fluid and does not utilize problematic, inaccurate and high maintenance devices such as screens, presses and other such hardware devices. This is accomplished, among other ways, because the separation of the oil in this invention is through use of water as a separation fluid in conjunction with some mechanical mixing.

It is a further object of this invention to provide such a system that is relatively simple in design, eliminates the need for substantial control and mechanical equipment and thereby making this invention relatively inexpensive, which the invention is and accomplishes.

It is a further object of this invention to provide such a system which greatly reduces the waste of existing commercial food manufacturing processes and thereby is more environmentally desirable. This invention accomplishes this by achieving a much greater oil and fat recovery rate and thereby greatly reducing the volume of waste from the system.

It is a further object of this invention to provide such a system which results in a much higher valued oil recovered. This invention accomplishes this by recovering or producing a food grade oil, which can be recycled and reused in the same or other commercial processes at a food grade value and price instead of at waste oil/grease prices.

There have been other unsuccessful attempts to achieve the oil and fat recovery that this invention has achieved. There has been a long felt, but unrealized need for such a solution. Other important features and advantages to this invention are:

(A) the short time required to obtain a phase separation between the oil, hot water and the food particle slurry, which allows the extraction of oil from crumbs on a continuous and commercial basis;

(B) the recovery of food grade oil by this invention is technically feasible and economically prudent within a food processing plant, which has heretofore been unsuccessfully accomplished by others;

(C) the removal of oil from a food processing plant's waste stream is socially and environmentally desirable and increases the potential economic value of the spent sludge; and (D) the recovered oil can be reused in the manufacturing process from which the oil laden crumbs were received, and can also be used as feedstock for the manufacture of fuel for diesel engines, commonly referred to as biodiesel. Although not as desirable or valuable, the recovered oil can also be converted to "yellow grease" and marketed as such to conventional rendering facilities.

Other objects, features and advantages of this invention will appear from the specification, claims and accompanying drawings which form a part hereof. In carrying out the objects of this invention, it is to be understood that its essential features are susceptible to change in design and structural arrangement with only one preferred embodiment being illustrated in the accompanying drawings, as required.

BRIEF DESCRIPTION OF DRAWINGS

In the accompanying drawings which form a part hereof.

DESCRIPTION OF THE PREFERRED EMBODIMENT

Figure 1:
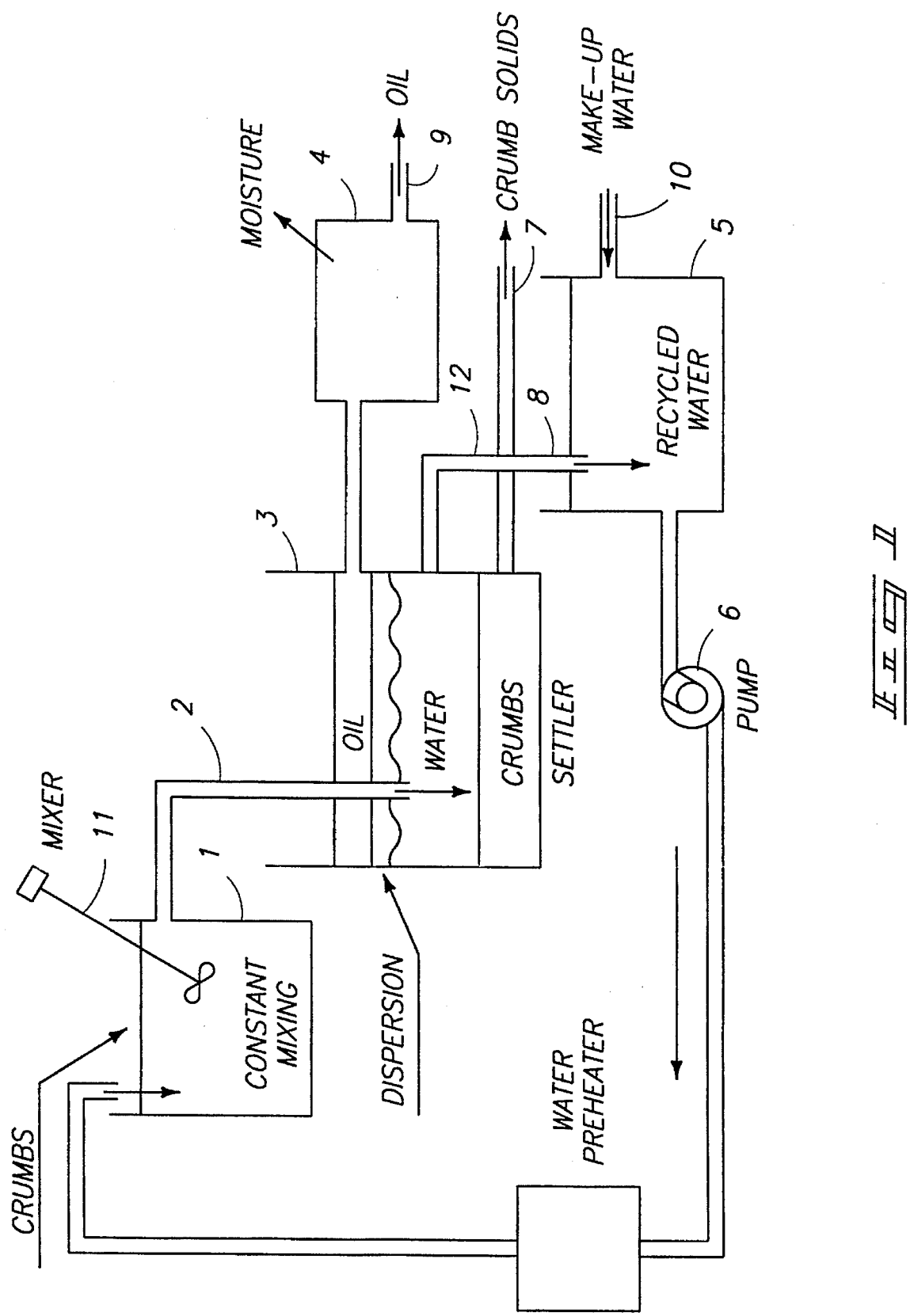
FIG. 1 illustrates a two stage application of the process of one embodiment of the invention.

This invention generally provides a process and apparatus for the separation of oil or fat from carbohydrate matrices, food particles and crumbs. The process can be designed in either a continuous process or by batch.

Many of the fastening, connection, welding, process, mixing, welding and other means and components utilized in this invention are widely known and used in the field of the invention described, and their exact nature or type is not necessary for an understanding and use of the invention by a person skilled in the art or science, and they will not therefore be discussed in significant detail.

The various components shown or described herein for any specific application of this invention can be varied or altered as anticipated by this invention. This invention comprises a unique combination of elements, each element of which can be accomplished by one of several different means or variations for a specific application of this invention. The practice of a specific application of any element may already be widely known or used in the art or by persons skilled in the art or science and each will not therefore be discussed in significant detail.

Although this invention applies to the separation and removal of oils and animal fats, for ease of reference, the terms oils or oil will be used herein and should be considered to refer to both oils and fats. Also, this invention applies to use for crumbs, carbohydrate matrices and food particles of all kinds, however, for ease of reference, the terms crumb or crumbs will be used generically to refer to all applications. Still further, while the solvent used to separate the oil from the crumb can be water or a solution of water and other compounds, i.e. an aqueous solution, the term water will be used generically to refer to water or such an aqueous solution.

It must be understood that a general process for the separation of oil from crumbs, such as this invention, must be adjustable and adaptable to meet feedstock variations. Feedstock variations in food particles, crumbs, carbohydrate matrices and other ingredients used in the manufacturing or frying process will require adjustments to the operating parameters of this invention, but the multitude of variations are still within the contemplation of this invention.

Examples of differences and possible components in the composition of the feedstock are different types, amounts and grades of oil, fat and carbohydrate matrices and other ingredients, chemicals, additives and seasonings which are part of the manufacturing or frying process. This invention can be adapted to achieve desirable levels of separation on these different variations and combinations by merely adjusting the operating parameters.

The more important operating parameters for the operation of the process and apparatus comprising this invention are: the ratio of water or aqueous solution to crumbs; the temperature at which the mixing and agitation of the aqueous solution and crumbs occurs; and the time the crumbs and aqueous solution are agitated. It is within the contemplation of this invention that the operational parameters described above can be altered or adjusted in magnitude and as they relate to one another for any given feedstock, to optimize the separation of the oil from the crumbs for that particular feedstock.

The operating parameters for any given application of this invention are likewise interrelated. By way of example but not limitation, if the amount of water or aqueous solution used is generally increased in a given application, the requisite mixing time may be lessened and the minimum mixing temperature may likewise be lessened.

As an example, it has been found that for crumbs from the frying and manufacturing of white trench fries, the approximate ratio of ten parts water to one part crumbs appears to achieve the best separation of the water, the crumbs and the oil. However, in such applications and depending on the sizing requirements or limitations of the equipment, it may be desirable to increase the ratio of water to crumbs to easily accommodate variations in the composition of the feedstock. i.e. the variations in the amount of oil and crumbs introduced into the system, since more water generally achieves at least the same degree of separation of the oil.

The temperature at which the feedstock is mixed or agitated is also a variable operational parameter. It has been found, by way of example, that the approximate minimum temperature for the mixing and agitation of certain batters from white french fry crumbs is one hundred forty degrees Fahrenheit. Mixing or agitating below the minimum temperature will likely result in the failure to achieve separation of the oil from the crumbs, whereas mixing above the minimum temperature achieves the desired results. Agitation at higher temperatures appear to improve the separation and agitation just below the boiling point of the agitated mixture appears to achieve the best results.

Regarding the agitation temperature, it should also be noted that before the oil-laden crumbs are introduced to the solvent, i.e. the water or aqueous solution, the temperature of the water or aqueous solution must be above whatever the minimum temperature is for the particular composition of oil-laden crumbs in order for separation to occur. It has been generally found that if the oil-laden crumbs are introduced to the water solvent and then heated to some minimum temperature, that instead of separation of the oil from the crumbs, an emulsion or gelatinous solution forms and separation does not occur.

The operational parameter of the agitation time can also generally be varied within the contemplation of this invention based on any particular feedstock composition. In the white french fry crumb example, the minimum agitation time for the degree of separation desired in that example was approximately two minutes. It further appeared that increasing the agitation time beyond a certain limit, such as five minutes in the white french fry example, did not result in any ascertainable increase in separation of the oil from the crumbs.

FIG. 1 illustrates the process in its most basic form, showing a mixing container 1 receiving crumbs containing oil or animal fat, from a manufacturing or cooking process, along with hot water.

The combination of crumbs and hot water is agitated, preferably by mechanical means such as by using mechanical mixer 2. After the minimum agitation time for the particular application, the agitated combination of hot water, crumbs and oil then flow into a settling container 3, where settling or stratification occurs. Because the mixing container 1 is elevationally higher than the settling container 3 and the flow of crumbs and hot water is continuous, the flow of the mixture into the settling container 3 can be controlled by controlling the flow of feedstock.

The process described by this invention, in its simplest form, then provides for the removal of each of the three components in the settling container 3, namely oil, water and crumbs at the levels to which they stratify, as further illustrated in FIG. 1.

Figure 2:
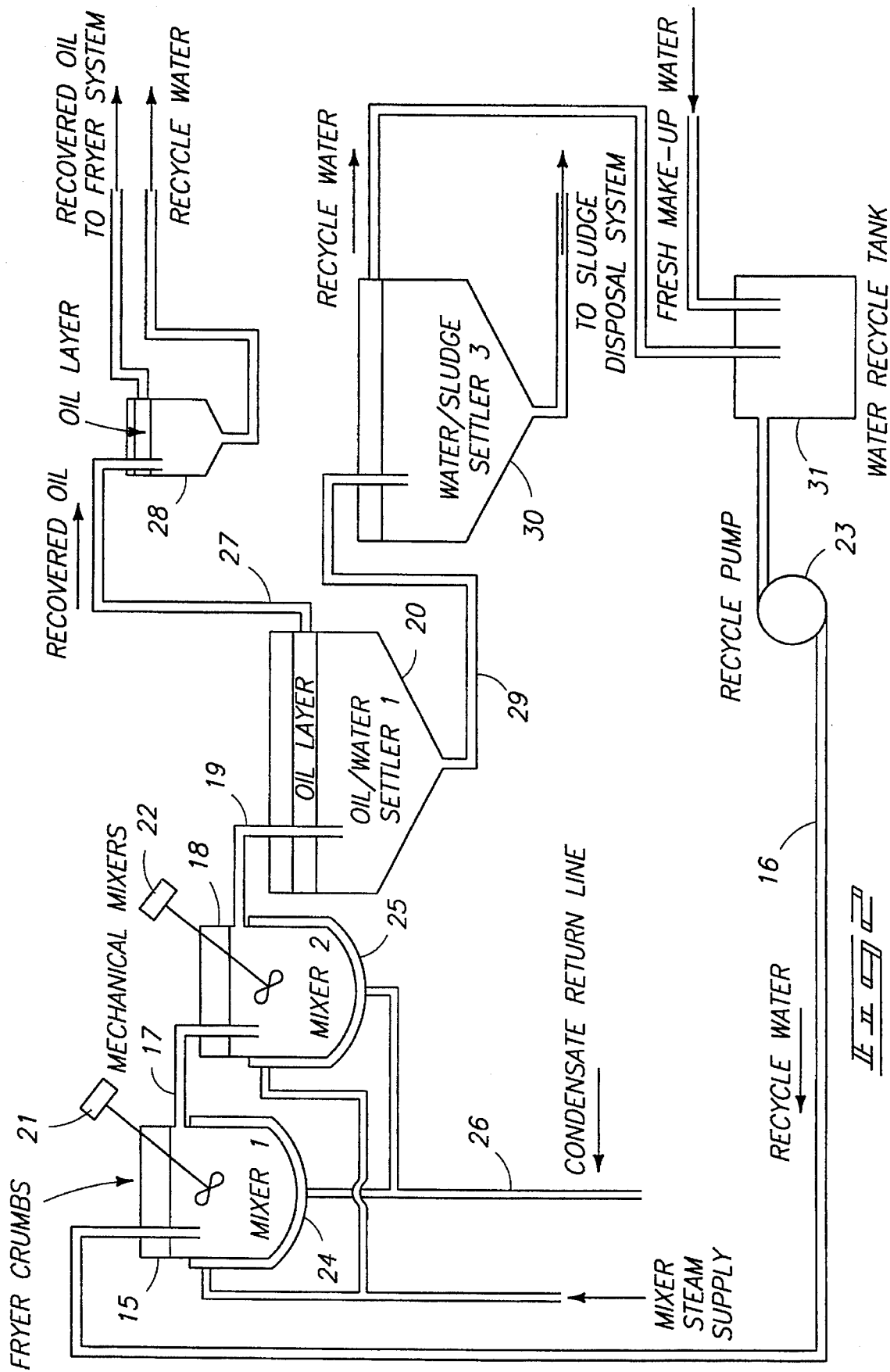
FIG. 2 is a schematic of one example of the flow of material in a two stage application agitation and two stage settling application of the invention.

FIG. 2 shows one example of the flow of material in a two stage agitation application and two stage settling application of the invention. The crumbs and hot water flow into the first mixing container 15 at whatever the desired flow rate and ratios are, wherein the combination is agitated and mixed. To date, temperatures in the approximate range of one hundred forty degrees to two hundred ten degrees Fahrenheit, or to its boiling point, have been used successfully. It should further be noted that if a pressurized vessel is used, the temperatures could be higher, however, it may not be as economically feasible.

The agitated mixture then flows from the first mixing container 15 to the second mixing container 18 by natural flow and gravity, since the first mixing container 15 is elevationally higher than the second mixing container 18. Further agitation of the mixture occurs.

During this mixing and agitation procedure in both agitation containers in the example illustrated in FIG. 2, the oil or animal fat is substantially removed and separated from the crumbs, thereby allowing for the later settling or stratification in the settling container(s).

The agitated, but now separated mixture of oil or fat, water and crumbs then flows into a first settling container 20. The first settling container 20 can be a larger container in which the fluid mixture is calm enough to allow for stratification to occur, i.e. the crumbs to settle to the bottom, the oil to rise to the top and the water to remain in between. The desired calmness in the first settling container 20 is generally accomplished by sufficiently sizing the container based on the flow rate and composition of the feedstock in any given application.

Although it is not necessary to practice this invention, it is preferable in a large capacity commercial operation to have more than one settling container to achieve a greater degree of separation of the oil from the water and crumbs and to achieve a higher percentage of oil recovered.

In the example of the invention illustrated in FIG. 2, the settling crumbs are removed from the bottom of the first settling container 20 and flow into a third settling container 30. The flow occurs because of the input of feedstock materials into the system and because the third settling container 30 is elevationally lower than the first settling container 20.

Further stratification in the third settling container 30 occurs to facilitate further separation of the crumbs from the water, with the crumbs settling to the bottom of the third settling container 30, which are then removed from the bottom portion of the third settling container 30 and taken to sludge disposal. The top portion of the mixture in the third settling container 30, which is substantially water, can then be removed and reused in the system via the recycling tank, or it can be disposed of.

From the first settling container 20, the top layer is substantially oil, but can also contain trace or minimal water and very minimal crumbs. This top layer is removed and can be recovered and reused in the manufacturing process or further treated by means such as filtering, drying, etc. In the system example illustrated in FIG. 2, the top layer from the first settling container can also be placed into a second settling container 28, wherein separation or stratification can further separate the oil from the water and minimal crumbs.

The overall number of agitation containers or stages and settling containers or stages can be varied and still be within the scope of this invention, depending on the specific results desired for water quality and the quality of the recovered oil.

FIG. 2 also shows a water recycle tank 31 which receives a combination of fresh water and recycled water, which is generally heated to the desired temperature and then pumped by pump 23 back into the first agitation container. This invention's recycling of the water and use of substantially, but not wholly, clean water, provides the benefit of greatly reducing or minimizing waste water, and is the environmentally preferable method.

To achieve the desired temperatures within first mixing container 15 and the second mixing container 18, any available source of heat can be utilized, such as steam from a steam plant.

Generally, the components from which the system have been selected to be readily available or easily constructable components for obvious economic reasons and for simplicity in construction. Because the components are known and readily available, the specific types, means of joining, etc. will not be discussed in significant detail as those skilled in the art do not need any further description to understand and practice any given hardware component.

FIG. 1 shows a schematic of the generic system, with a mixing container 1 with a mechanical mixing means 11 therein. Mixing container 1 can by any type of container to receive and hold the feedstock and must be sized to facilitate the desired volume depending on the particular application.

Once the components are mixed and agitated in mixing container 1 and based on the flow of feedstock and water into mixing container 1, the agitated mixture of crumbs, oil and water flow by gravity into settling container 3. Although the settling container 3 can be any type of container, it is preferred that it be substantially conical in configuration towards its lower end to facilitate the flow of settled crumbs to disposal through pipe 7. For any given feedstock composition, there will be a settling velocity during the separation of the crumbs from the water and oil and the size of the settling container 3 will need to be based in part on the given flow rate or volume of the feedstock that must be settled and the particular settling velocity of said feedstock. A larger sized settling container 3 will obviously facilitate the processing of a higher volume of feedstock and accommodate a wider variety of settling velocities.

In the settling container 3, the water sandwiched between the oil above and the crumbs below can be drained off by piping 8 to a recycle water storage container 5, or it can be discharged, as desired in the application. The oil layer on top in the settling container 3 flows out of the settling container 3 through piping 12, where it can be re-used, stored or further processed, depending on the specific application and desires of the operator.

As shown in FIG. 1, a dryer 4 is one option for further processing of the oil, and if used, the oil is then piped out of the drying through piping 9 for whatever destination or use is desired.

The water supply shown in FIG. 1 includes make-up water through piping 10 into the recycle water storage container 5, from which it is piped to pump 6 and can then be re-used in the system by re-introducing it into mixing container 1.

FIG. 2 also shows a general schematic of the process and apparatus, but with two stages of agitation of the feedstock, two stages of settling or stratification of the oil and an additional stage of settling for the water and crumbs.

The water is pumped to the first mixing container 15 though piping 16 and by pump 23. The oil-laden crumbs are also introduced into the first mixing container 15, where a mechanical mixer 21 agitates the mixture contained therein. The temperature of the first mixing container 15, and of the second mixing container 18 can maintained or supplemented through the use of steam using steam jackets 24 & 25. The steam can be supplied through piping 26.

FIG. 2 further shows the agitated mixture flowing through piping 17 into the second mixing container 18, where it is further agitated by mechanical agitator 22. The agitated mixture then flows from the second mixing container 18 into the first settling container 20, which is sized to receive the given flow and allow it to settle and stratify, resulting in essentially three layers, the top layer being substantially oil, the bottom layer being substantially crumbs and water.

The oil layer then flows through piping 27 to a second settling container 28, wherein further stratification of the substantially oil and water mixture occurs. The top layer of oil in the second settling container is then removed for use, and the water is piped from the lower part of the second settling container 28 for its designated use, which in FIG. 2, is to be recycled and re-used.

The crumbs and water in the first settling container are piped through piping 29 to a third settling container 30, wherein the crumbs further settle and separate from the water. The crumbs are removed from the lower portion of the third settling container 30 for disposal and the water is removed from the upper portion of the third settling container 30 for its intended use, which in the example in FIG. 2, is recycling and re-use through water recycle tank 31.

EXAMPLE

Fryer crumbs used for this experimentation that were from a commercial manufacturing facility were composed of between 30% and 60% oil by mass. An ether extraction analysis of the crumbs used in this experiment determined that the average oil content was approximately by mass. Initial batch flotation experiments have shown that over 90% of the oil in the crumbs can be recovered using this water separation method. Table 3 shows the percentage oil recovery assuming a 50% oil content.

From Table 3, some of the oil contents were higher than the original values, which is due to the fact that the samples were taken in various places within the sample bag of crumbs, and with settling the oil content varies throughout the bag.

TABLE 3

Percent Oil Recovery

| Food Particle Wt. (grams) | Vol. Water (ml) | Recovered Oil (min) | % Recovery (crumbs 50% oil by mass) |
| --- | --- | --- | --- |
| 20.019 | 300 | 10.702 | 106 |
| 20.043 | 300 | 9.864 | 99.4 |
| 20.076 | 300 | 10.549 | 105 |
| 52.237 | 350 | 21.987 | 84.0 |

Several variables in the water/oil separation process have been examined to determine the effect of these parameters on the water/oil separations process, including the temperature of the water and the crumbs, length of mixing time and the ratio of crumbs to water. The initial tests used cold crumbs and cold water which were mixed and then brought to boiling. The oil which rose to the water surface after boiling could then be easily collected. Often however the remaining water and food particle mixture was a gelatinous material that did not separate and was difficult to filter. In order to eliminate this gelatinous material which is thought to be caused by the slow process of bringing the cold substances to sufficiently preheated temperature, tests using heated crumbs (more closely simulating plant conditions) in boiling water were conducted. This method effectively separated the oil from the crumbs as shown in Table 3.

It was observed that by combining boiling water to crumbs in a 10 to 1 ratio, the resulting mixture, after boiling and settling, separated into three distinct layers: an oil layer at the surface, a food particle layer that settled to the bottom and a water layer in between.

Samples boiled for differing lengths of time (between 2.5 and 5 minutes) showed better than 90% oil recovery. However, the longer boiling time showed no increase in the oil recovery. Sample differences account for the small variations in the percentage of oil recovery.

TABLE 4

| | Temperature Effects | | |
|---|---|---|---|
| Food Particle Wt. (grams) | Water Volume (ml) | Time (min) | % Recovery |
| 10.038 | 100 | 2.5 | 98% |
| 10.025 | 100 | 3.0 | 97% |
| 10.084 | 100 | 3.5 | 91% |
| 10.041 | 100 | 4.0 | 97% |

To determine the water temperature effect on the separation, 600 ml beakers were filled with cold water, a sample of crumbs was weighed and added to the beakers; the mixture was agitated and brought to a boil on a magnetic hot plate and appearance of the mixture was reported as a function of temperature. The agitation process was then stopped and the mixture allowed to cool, was refrigerated and the oil cake was then removed and weighed. Then 600 ml beakers were filled with boiling water in volumes from 250 ml to 400 ml, weighed samples of heated crumbs were placed in the boiling water and the boiling time, oil cake mass and the food particle to water ratio was measured.

To determine the effect of boiling time on mass of oil separated, the following general procedure was followed:

(A) Six numbered beakers were each filled with 100 ml of boiling water;

(B) A 10 gram sample of heated fryer crumbs was added to each beaker of boiling water. The crumbs had been weighed to the nearest one-hundredth of a gram with a balance and obtained from a larger quantity of stirred and heated crumbs;

(C) The first mixture was boiled for 2.5 minutes, the second for 3 minutes and so on;

(D) Oil was removed from the mixture after overnight refrigeration;

(E) Oil cake was surface dried by blotting it dry with a paper towel and weighed five times during the next two days.

To determine the preferred food particle to water ratio, five beakers were filled with one hundred milliliters of boiling water, with a weighed sample of crumbs being added to each beaker. Each sample was a different weight and the appearance of the boiled mixture was observed.

Ether extraction of the food particle residue before and after the boiling process was used to determine oil content.

An average oil recovery of over 90% resulted under laboratory conditions using heated crumbs at approximately 100 degrees Centigrade combined with boiling water at a ratio of 1 to 10, and boiled for 2 to 5 minutes. When agitation was stopped, the remaining water, and crumbs separated quickly. The oil floated to the top and the food particle solids settled to the bottom. Settled crumbs could then be removed and filtered. The separate water layer could be recycled to a food particle disintegration mixing tank.

Although different examples of applications of the invention are described herein and in said examples, differing number of stages are shown for agitation and for settling or stratification, it should be noted that there can be any one of a number of stages for either the agitation, settling or recycling for that matter and still practice the invention as described and intended herein.

While the preferred embodiment for the invention has been described in detail, those familiar with the art to which this invention relates will recognize various alternative designs and embodiments for carrying out the invention, as defined by the claims which follow.

The invention claimed is:

1. A process for the separation of cooking oil from oil laden food crumbs, comprising the steps of:
   a. providing food crumbs which contain cooking oil;
   b. providing water to the food crumbs, the water being above a minimum temperature sufficient to effect separation of the food crumbs and oil, resulting in a combination of food crumbs, oil and water;
   c. agitating the combination of food crumbs, oil and water;
   d. placing the combination of food crumbs, oil and water into a non-turbulent settling container where the combination of food crumbs, water and oil is allowed to stratify; and
   e. removing stratified oil from the upper portion of the settling container.

2. A process for the separation of oil from food crumbs as recited in claim 1, and in which the minimum temperature at which the water is provided is one hundred forty degrees fahrenheit.

3. A process for the separation of oil from food crumbs as recited in claim 1, and in which the water provided to the food crumbs is provided in a minimum ratio of ten parts water to one part food crumbs.

4. A process for the separation of oil from food crumbs as recited in claim 1, and in which the combination of food crumbs, oil and water is agitated for a minimum of two minutes.

5. A process for the separation of oil from food crumbs as recited in claim 1, and which further comprises the following step:
   a. reusing stratified oil taken from the upper portion of the settling container, as cooking oil.

6. A process for the separation of cooking oil from oil laden food crumbs, comprising the steps of:
   a. providing food crumbs which contain cooking oil to a first mixing container;
   b. providing water to the food crumbs in the first mixing container, the water being above a minimum temperature sufficient to effect separation of the food crumbs and oil, resulting in a combination of food crumbs, oil and water;
   c. agitating tile combination of food crumbs, oil and water in the first mixing container;
   d. allowing an upper portion of the combination of food crumbs, oil and water in the first mixing container to flow into a second mixing container;
   e. agitating the combination of food crumbs, oil and water in the second mixing container;

f. allowing an upper portion of the combination of food crumbs, oil and water in the first mixing container to flow into a non-turbulent settling container where the combination of food crumbs, water and oil is allowed to stratify; and g. removing stratified oil from the upper portion of the settling container.

7. A process for the separation of oil from food crumbs as recited in claim 6, and which further comprises the following step:

a. reusing stratified oil taken from the upper portion of the settling container as cooking oil.

8. A process for the separation of oil from food crumbs as recited in claim 6, and in which the minimum temperature at which the water is provided is one hundred forty degrees fahrenheit.

9. A process for the separation of oil from food crumbs as recited in claim 6, and in which the water provided to the food crumbs is provided in a minimum ratio of ten parts water to one part food crumbs.

10. A process for the separation of oil from food crumbs as recited in claim 6, and in which the combination of food crumbs, oil and water is agitated for a minimum of two minutes.

11. A process for the continuous separation of cooking oil from oil laden food crumbs, comprising the steps of:

a. providing a continuous flow of food crumbs which contain oil;

b. providing a continuous flow of water to the food crumbs, the water being above a minimum temperature sufficient to effect separation of the food crumbs and oil, resulting in a combination of food crumbs, oil and water;

c. agitating the combination of food crumbs, oil and water;

d. allowing an upper portion of the combination of food crumbs, oil and water to continuously flow into a non-turbulent settling container where the combination of food crumbs, water and oil stratifies; and e. removing stratified oil from the settling container.

12. A process for the continuous separation of cooking oil from oil laden food crumbs as recited in claim 11, and further comprising the steps of:

a. removing stratified water from a middle portion of the settling container; and b. utilizing the water removed from the settling container as a part of the continuous flow of water to the food crumbs in the first mixing container.

13. A process for the continuous separation of cooking oil from oil laden food crumbs, comprising the steps of:

a. providing a continuous flow of food crumbs which contain oil into a first mixing container;

b. providing a continuous flow of water to the food crumbs in the first mixing container, the water being above a minimum temperature sufficient to effect separation of the food crumbs and oil, resulting in a combination of food crumbs, oil and water;

c. agitating the combination of food crumbs, oil and water in the first mixing container;

d. allowing an upper portion of the combination of food crumbs, oil and water in the first mixing container to flow into a second mixing container;

e. agitating the combination of food crumbs, oil and water in the second mixing container;

f. allowing an upper portion of the combination of food crumbs, oil and water in the second mixing container to flow into a non-turbulent settling container where the combination of food crumbs, water and oil is allowed to stratify; and g. removing the separated oil from the settling container.

14. A process for the continuous separation of cooking oil from oil laden food crumbs as recited in claim 13, and further comprising the steps of:

a. removing stratified water from a middle portion of the settling container; and b. utilizing the water removed from the settling container as the continuous flow of water to the food crumbs in the first mixing container.

15. A process for the continuous separation of cooking oil from oil laden food crumbs as recited in claim 13, and further comprising the steps of:

a. removing food crumb solids from the lower portion of the settling container for disposal.

* * * * *